United States Patent [19]
Braun

[11] Patent Number: 5,923,464
[45] Date of Patent: Jul. 13, 1999

[54] SUBSTANCE FOR FRONT SURFACE MIRROR

[75] Inventor: Hilarion Braun, Gilbert, Ariz.

[73] Assignee: Summit Coating Technologies, LLC, Elmhurst, Ill.

[21] Appl. No.: 08/771,062

[22] Filed: Dec. 20, 1996

[51] Int. Cl.$^6$ .............................. G02B 5/20; G02B 1/10; F21V 9/06
[52] U.S. Cl. ........................ 359/350; 359/361; 359/584
[58] Field of Search ..................... 359/350, 359, 359/360, 384, 361; 427/383.9; 346/140 R

[56] References Cited

U.S. PATENT DOCUMENTS

| | | | |
|---|---|---|---|
| 4,956,653 | 9/1990 | Braun | 346/140 R |
| 5,100,486 | 3/1992 | Krikorian et al. | 427/310 |

*Primary Examiner*—Cassandra Spyrou
*Assistant Examiner*—Audrey Chang
*Attorney, Agent, or Firm*—Leydig, Voit & Mayer, Ltd.

[57] ABSTRACT

A front surfaced mirror having a reflective surface of Tantalum Aluminide for reflecting light beams, especially, but not limited to those having wavelengths in and near the infrared and ultraviolet bands.

20 Claims, 3 Drawing Sheets

SUBSTANCE FOR FRONT SURFACE MIRROR

FIELD OF THE INVENTION

The present invention relates to mirrors and more particularly to front surface mirrors.

BACKGROUND

Mirrors have been known for a considerable period of time. The reflective properties of a mirror have been used in a vast variety of situations. For instance a headlight on an automobile has a mirror on the back portion of the light. This mirrored surface reflects light from the headlight in a defined direction, i.e. toward the road. Mirrors have been used to direct light in a great variety of well known situations.

Mirrors also come in two general categories, i.e. back surfaced and front surfaced. A back surfaced mirror is perhaps the most common form of mirror. It typically includes a piece of glass with a substance such a paint on the back side. Reflected light therefore needs to pass through the glass before it is reflected away from the mirror. Once reflected, the light passes back out through the glass. Passing through the glass (twice) creates ambiguity in the direction of the reflection. The glass bends the light to a degree, creating an imperfect reflection.

In some applications reflective accuracy is imperative. A front surfaced mirror improves reflective accuracy. On such a mirror, the front surface is as smooth as is humanly possible to increase reflective accuracy. The reflective surface is the first surface light contacts. The front surface immediately reflects the light before it passes through a piece of glass, removing ambiguities inherent when the light passes through glass. Aluminum, Al, is commonly used as the reflective surface on front surface mirrors.

A unique situation for use of mirrors arises when the mirror reflects light rays in and near the infrared and ultraviolet bands. Such a situation may arise for instance when laser beams are reflected. The problem is that aluminum is a reactive metal when in the presence of such light. A chemical reaction with aluminum and surrounding material creates ambiguities on the surface of the mirror, injuring or destroying the accuracy of the reflection. Aluminum is also easily scratched further preventing it from being an ideal material for a front surface mirror. The high reflectivity of aluminum, however, continues to make aluminum a substance of choice for front surface mirrors.

Various methods have unsuccessfully attempted to solve the problems encountered with reflecting light in the infrared and ultraviolet bands. Rear surface mirrors minimize reactivity, but are often not suitable due to the inaccuracies from the glass. Front surface mirrors, are somewhat useful, but are quickly destroyed with reactivity, abrasion and other degradation of the aluminum. Sometimes a thin layer of compound such as silicon oxide or silicon dioxide is used to lower the rate of degradation of the reflective surface on a front surface mirror. Such a layer, however, often absorbs light in the infrared or ultraviolet bands, making the mirror useless when the light to be reflected is in such ranges. Moreover, the coating creates ambiguities much like glass as the film thickness approaches the wavelength of light interference from back to front makes the reflection wavelength selective.

Various mirror applications need a mirror with excellent reflectivity properties in and near the infrared and ultraviolet bands similar to that of aluminum. The reflective surface, however, needs to be abrasion resistant, corrosion resistant and resist other chemical reactivity. Preferably these properties would more closely resemble the degradation properties of stainless steel. Further, the mirror needs to have the reflective accuracy of a front surface mirror.

SUMMARY OF THE INVENTION

The present invention is a front surface mirror using Tantalum Aluminide, $TaAL_3$. The substance has been found to resist corrosion and abrasion, having degradation properties similar to that of stainless steel. Tantalum Aluminide has excellent reflectivity properties in the near infrared to the ultraviolet bands similar to that of aluminum. While aluminum is chemically very reactive and abrasion sensitive, Tantalum Aluminide does not have such drawbacks. Tantalum Aluminide can be vapor deposited onto an optical flat or other smooth surface either by sputtering or by electron beam disposition. Opacity is readily obtained when the $TaAL_3$ coating reaches a few thousand Angstrom in thickness.

DETAILED DESCRIPTION

Figure 1:
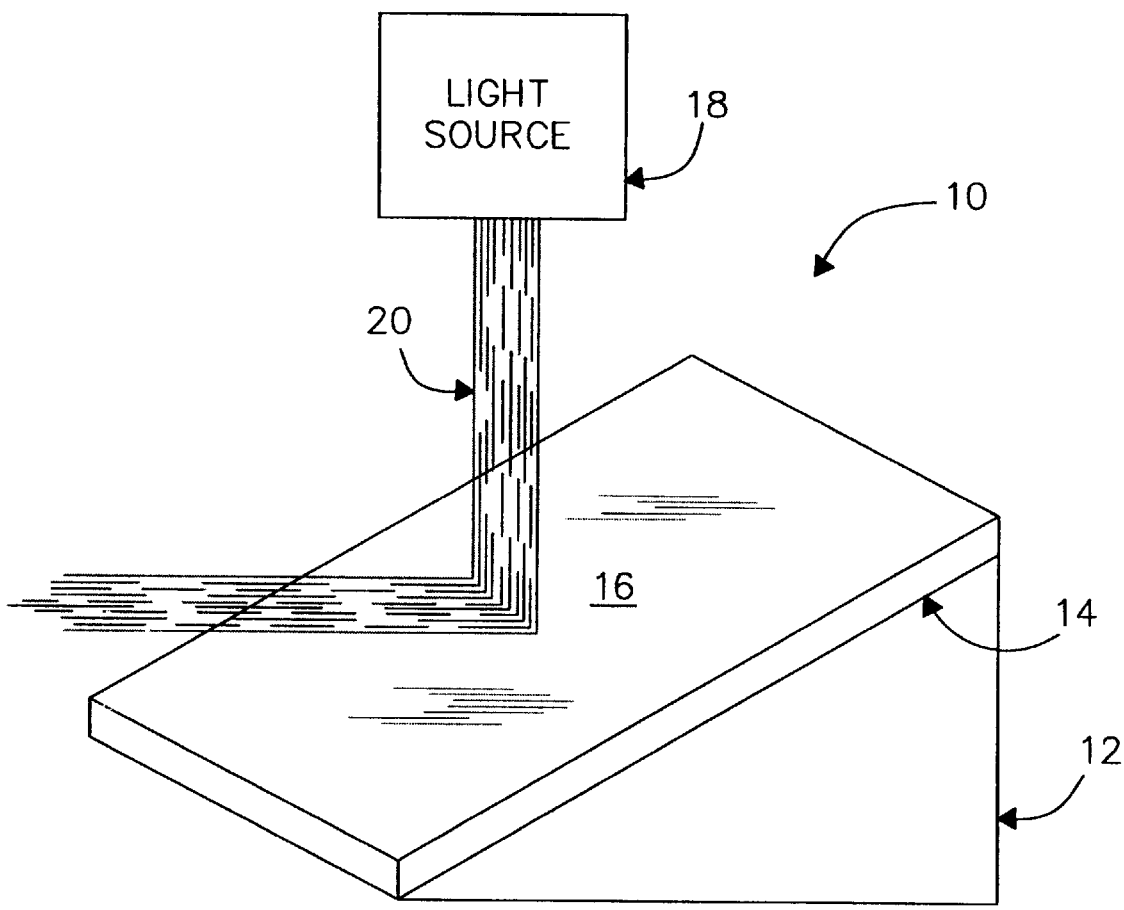
FIG. 1 is a prospective view of a front surfaced mirror.

As shown in FIG. 1, the present invention 10 may be a front surfaced mirror, having a reflective surface of Tantalum Aluminide $TaAL_3$. The invention 10 may have blank 12 with a surface 14 coated with a reflective coating 16. The invention may further include a light source 18, emitting a reflected light beam 20. Multiple mirrors 10 may be used in a single application. The front reflective layer 16 may include partial transmission to form a wavelength selective mirror 10.

The blank 12 may be an optical flat or other smooth surface and may be formed of plastic or other suitable material. Other common materials for the blank 12 include sheets of metal or films. Others may be discovered in the future. Tantalum Aluminide is expected to adhere to any material upon which metal coatings may be applied, and adhesion promoters may be used.

The surface 14 may be flat, arcuate or any other desired shape, depending upon the type of reflective properties desired. The smoothness of the surface 14 impacts the accuracy of the reflectivity. The reflective coating 16 will help smooth a surface 14 if applied under standard metal coating conditions.

The reflective coating 16 includes Tantalum Aluminide, $TaAL_3$ and more preferably only includes Tantalum Aluminide. The Tantalum Aluminide may be obtained from Cerac, P.O. Box 1178, Milwaukee, Wis. 53201-1178 under the name Tantalum Aluminum. Such reflective coating 16 may be vapor deposited on the surface 14 of the blank 12 via sputtering, via electron beam deposition, or via other well known methods in the Prior Art. The coating 16 readily obtains opacity within a few thousand Angstrom thickness, i.e. approximately 3000 Angstrom. The coating 16 should be applied thick enough to reach opacity and has no upper limit on thickness other than perhaps cost. A desired thickness of the reflective coating 16 is between 3000 and 8000 Angstrom.

In use, a light source 18 may send a beam of light 20 toward the reflective coating 16, where it is redirected in a desired direction. The beam of light 20 may include wavelengths in the infrared, ultraviolet bands, and/or throughout the visible spectrum.

Figure 2:
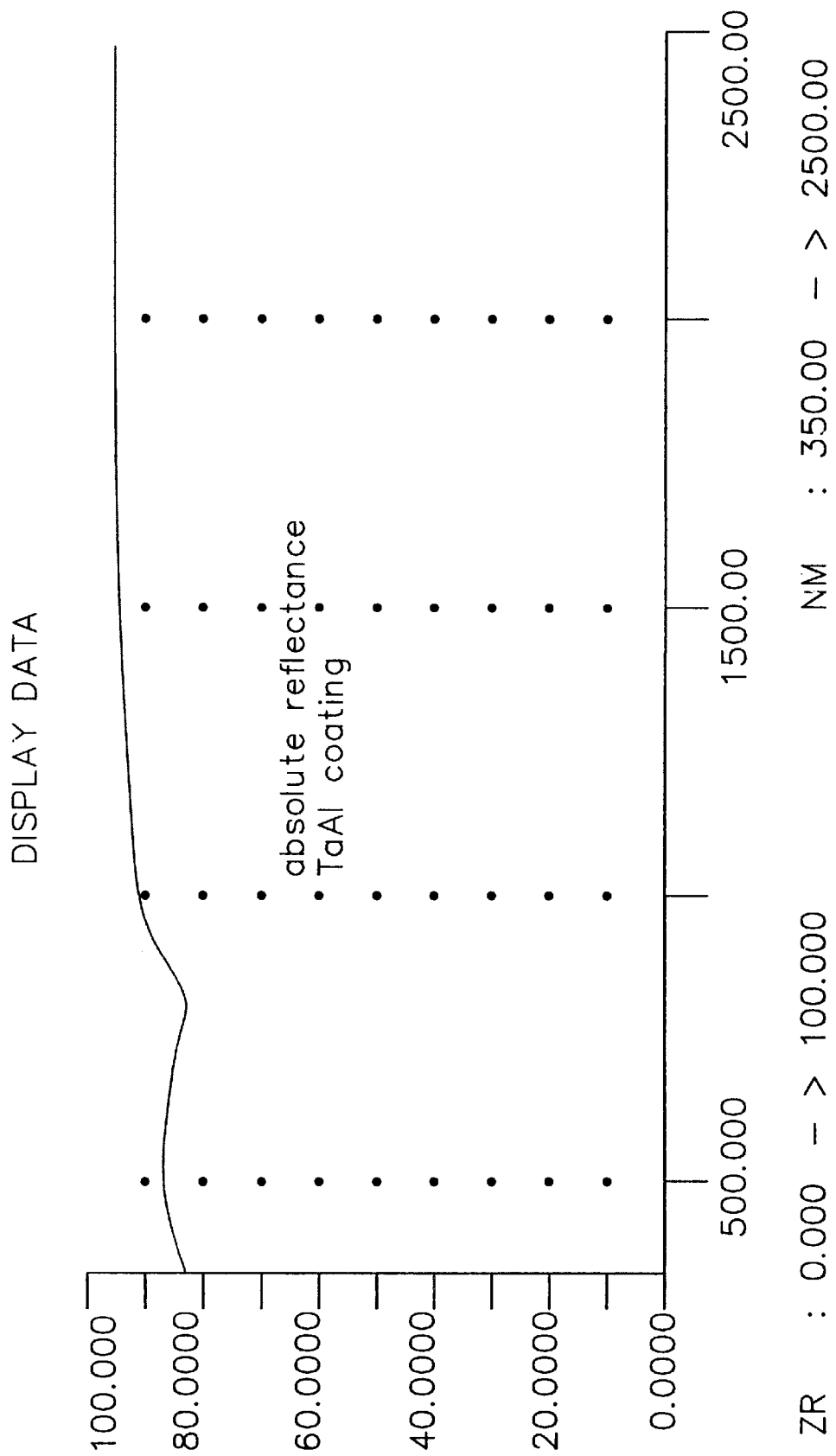
FIG. 2 is a graph showing the percent reflectivity of Tantalum Aluminide in between the wavelength 350.00 NM and 2500.00 NM with E=0.040.
Figure 3:
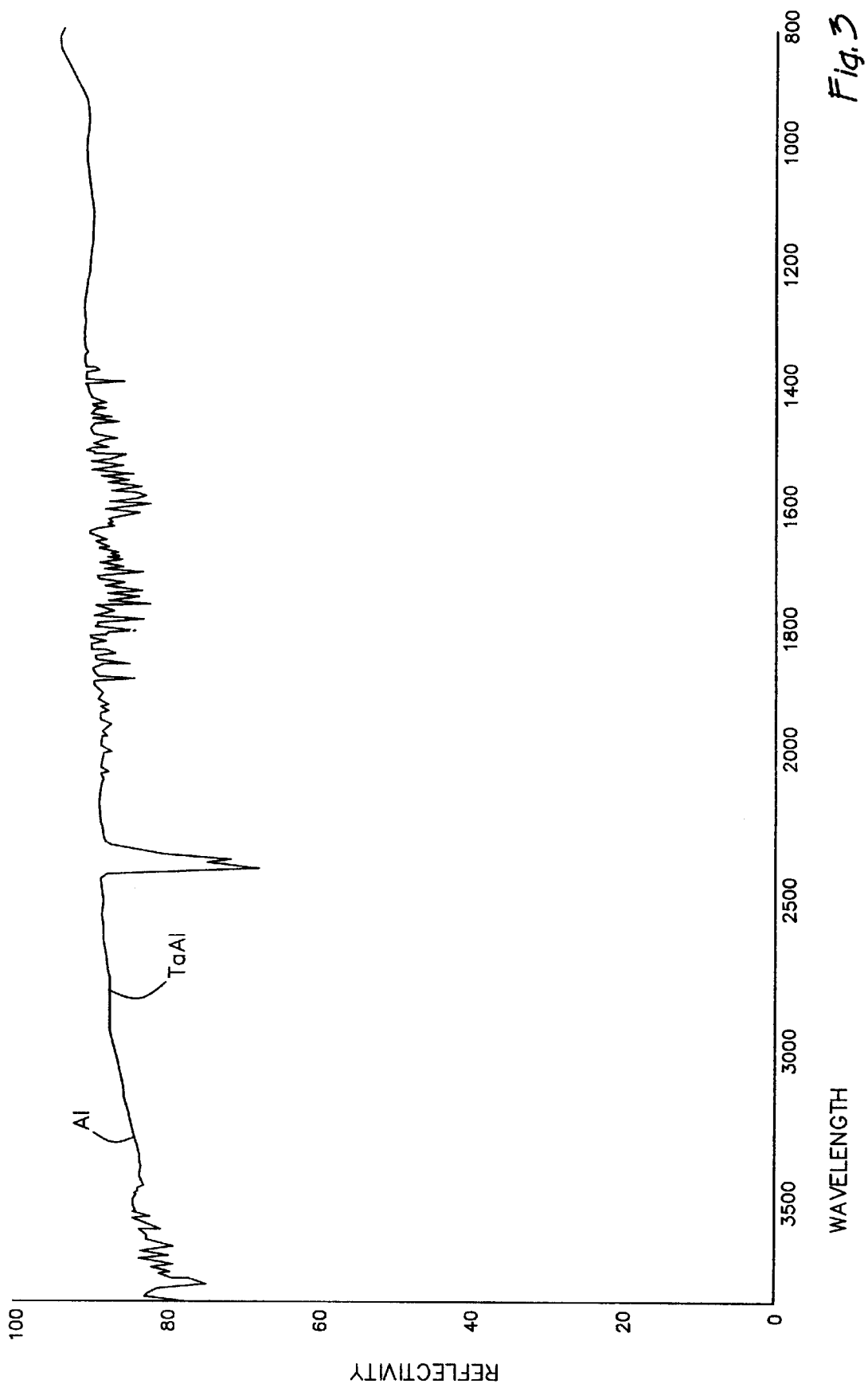
FIG. 3 is a graph showing the percent reflectivity of aluminum and Tantalum Aluminide to be identical or near identical over a variety of wavelengths.

As shown in FIGS. 2 and 3 Tantalum Aluminide has excellent optic and reflective properties similar to that of Aluminum throughout the wavelengths of 500.00 NM to 12.5 micrometers. Tantalum Aluminide has high stability and has strength/durability properties comparable to that of stainless steel. Tantalum Aluminide is capable of withstanding a sandstorm as might be encountered in a desert application. Further it is corrosion and abrasion resistant. In contrast, aluminum, Al, is chemically very reactive and abrasion sensitive, especially when affected by light in the infrared and ultraviolet bands. Further the $TaAL_3$ surface acts as a heat shield under high operating temperatures or in a corrosive environment.

Although the present invention has been described with reference to preferred embodiments, workers skilled in the art will recognize that changes may be made in form and detail without departing from the spirit and scope of the invention. It is the intent of this patent to protect the whole of the invention.

I claim:

1. A reflecting device comprising:
   at least one blank, the blank having a front, a back and side surfaces;
   a reflective layer jointed to the front surface of the blank and forming an outermost layer of said reflecting device, the reflective layer comprising Tantalum Aluminide and the reflective layer being sufficiently thick to reach opacity; and
   a light source, the light source emitting a beam of light that is reflected off the reflective layer, the light beam having at least one wavelength selected from the group of wavelengths consisting of infrared, visible and ultraviolet bands; and
   wherein said reflective layer is a first surface contacted by the light beam.

2. A reflective device comprising:
   at least one blank, the blank having a front, a back and a side surfaces; and
   a reflective layerjoined to the front surface of the blank and forming an outermost layer of said reflective device, the reflective layer comprising Tantalum Aluminide.

3. The device of claim 2 wherein the device is a mirror.

4. The device of claim 3 further comprising:
   a light source, the light source emitting a beam of light that is reflecting off the reflective layer.

5. The device of claim 4 wherein the light source emits a light beam having a wavelength in the infrared band.

6. The device of claim 2 wherein the reflective layer is sputtered onto the blank.

7. The device of claim 2 wherein the front reflective layer $TaAL_3$ has partial transmission to form a wavelength selective mirror.

8. A reflective device comprising:
   at least one blank the blank having a front, a back and a side surfaces;
   a reflective layer joined to the front surface of the blank, the reflective layer comprising Tantalum Aluminide;
   a light source, the light source emitting a beam of light that is reflecting off the reflective layer; and
   wherein the device is a mirror; and
   wherein the light source emits a light beam having a wavelength in the ultraviolet band or visible spectrum.

9. A reflective device comprising:
   at least one blank, the blank having a front, a back and a side surfaces;
   a reflective layer joined to the front surface of the blank, the reflective layer comprising Tantalum Aluminide;
   a light source, the light source emitting a beam of light that is reflecting off the reflective layer; and
   wherein the device is a mirror; and
   wherein the light beam is a laser beam.

10. A reflective device comprising:
    at least one blank, the blank having a front, a back and a side surfaces;
    a reflective layer joined to the front surface of the blank, and forming an outer most layer of said reflective device, the reflective layer comprising Tantalum Aluminide; and
    wherein the reflective layer is sufficiently thick to reach opacity.

11. A method comprising:
    applying a reflective surface of Tantalum Aluminide on a front surface of a blank to form an outermost layer; and
    reflecting a light beam off the reflective surface, the reflective surface being a first surface of contact with the light beam.

12. The method of claim 11 wherein the reflective surface is a few thousand Angstrom thick.

13. The method of claim 11 wherein the light beam has a wavelength in the infrared band.

14. The method of claim 11 wherein the light beam has a wavelength in the ultraviolet band.

15. The method of claim 11 wherein the step of applying comprises:
    sputtering the Tantalum Aluminide on the surface.

16. The method of claim 11 wherein the step of applying forms a front surfaced mirror.

17. The method of claim 11 wherein the step of applying comprises:
    depositing the Tantalum Aluminide via electron beam vaporization on the surface.

18. The method of claim 11 wherein the surface is a flat surface.

19. The method of claim 11 where the $TaAL_3$ surface acts as a heat shield under high operating temperatures.

20. The method of claim 11 where the $TaAL_3$ surface acts as a shield in a corrosive environment.

* * * * *

UNITED STATES PATENT AND TRADEMARK OFFICE
CERTIFICATE OF CORRECTION

PATENT NO. : 5,923,464
DATED : July 13, 1999
INVENTOR(S) : Hilarion Braun

It is certified that errors appear in the above-identified patent and that said Letters Patent is hereby corrected as shown below:

In claim 8, line 3, after "blank", insert -- and forming an outermost layer of said reflective device, --, Signed and Sealed this Fourth Day of April, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 5,923,464

DATED : July 13, 1999

INVENTOR(S) : Hilarion Braun

It is certified that error appears in the above-identified patent and that said Letters Patent is hereby corrected as shown below:

In claim 8, line 3, after "blank", delete "and forming an outermost layer of said reflective device,", as inserted by Certificate of Correction which issued April 4, 2000.

Signed and Sealed this

Twentieth Day of June, 2000

*Attest:*

Q. TODD DICKINSON

*Attesting Officer*  *Director of Patents and Trademarks*